US011004138B2

(12) United States Patent
Giampaolo et al.

(10) Patent No.: US 11,004,138 B2
(45) Date of Patent: *May 11, 2021

(54) SYSTEMS AND METHODS FOR WARDROBE MANAGEMENT

(71) Applicant: CAPITAL ONE SERVICES, LLC, McLean, VA (US)

(72) Inventors: Marco S. Giampaolo, Berwyn, IL (US); Karen Nickerson, Chicago, IL (US); Justin Wishne, Chicago, IL (US); Drew Jacobs, Arlington, VA (US); Justin Smith, Chicago, IL (US); Hannes Jouhikainen, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 152 days.

This patent is subject to a terminal disclaimer.

(21) Appl. No.: 16/299,842

(22) Filed: Mar. 12, 2019

(65) Prior Publication Data

US 2019/0205967 A1 Jul. 4, 2019

Related U.S. Application Data

(63) Continuation of application No. 15/665,913, filed on Aug. 1, 2017, now Pat. No. 10,282,772.

(Continued)

(51) Int. Cl.
*G06Q 30/00* (2012.01)
*G06Q 30/06* (2012.01)
*G06Q 10/08* (2012.01)

(52) U.S. Cl.
CPC ....... *G06Q 30/0631* (2013.01); *G06Q 10/087* (2013.01); *G06Q 30/0623* (2013.01);

(Continued)

(58) Field of Classification Search
CPC ............. G06Q 30/0631; G06Q 10/087; G06Q 30/0643; G06Q 30/0623; G06Q 30/0641; G06Q 30/0625
See application file for complete search history.

(56) References Cited

U.S. PATENT DOCUMENTS 7,149,665 B2 * 12/2006 Feld ........................ G06T 17/00
703/2
7,714,912 B2 5/2010 Faisman et al.
(Continued)

FOREIGN PATENT DOCUMENTS

EP 1959394 A2 8/2008

OTHER PUBLICATIONS

"Clueless about fashion? Add Cluise to your wardrobe," The Vancouver Sun (Vancouver, BC), Feb. 6, 2016 (Year: 2016).*
(Continued)

*Primary Examiner* — Anne M Georgalas
(74) *Attorney, Agent, or Firm* — Troutman Pepper Hamilton Sanders LLP; Christopher J. Forstner; John A. Morrissett

(57) ABSTRACT

A system includes one or more memory devices storing instructions, and one or more processors configured to execute the instructions to perform steps of a method. The system may provide a virtual wardrobe management system. The system may store wardrobe data associated with a plurality of garments. The system may then receive input data indicative of a garment selection. The system may identify the garment based on the input data received. The system may then generate a garment recommendation based on the selected garment and the stored wardrobe data and provide an indication of the recommendation to a computing device.

20 Claims, 8 Drawing Sheets

Related U.S. Application Data

(60) Provisional application No. 62/437,710, filed on Dec. 22, 2016.

(52) U.S. Cl.
 CPC ..... *G06Q 30/0625* (2013.01); *G06Q 30/0641* (2013.01); *G06Q 30/0643* (2013.01)

(56) References Cited

U.S. PATENT DOCUMENTS

| | | | |
|---|---|---|---|
| 8,682,738 B2* | 3/2014 | Ivanov | G06Q 30/02 |
| | | | 705/26.1 |
| 9,344,673 B1 | 5/2016 | Buchheit et al. | |
| 9,609,265 B2* | 3/2017 | Lewis | G07F 5/00 |
| 9,898,742 B2 | 2/2018 | Higgins et al. | |
| 10,008,039 B1 | 6/2018 | Neustein et al. | |
| 10,176,636 B1* | 1/2019 | Neustein | G06T 7/246 |
| 10,262,440 B2* | 4/2019 | Ravindra | G06Q 30/0643 |
| 10,339,593 B2* | 7/2019 | Beckham | G06Q 20/204 |
| 2002/0045959 A1 | 4/2002 | Van Overveld | |
| 2002/0121980 A1* | 9/2002 | Wan | G06Q 30/06 |
| | | | 340/572.1 |
| 2003/0101105 A1 | 5/2003 | Vock | |
| 2010/0191770 A1 | 7/2010 | Cho et al. | |
| 2012/0192235 A1* | 7/2012 | Tapley | G06Q 30/0643 |
| | | | 725/60 |
| 2012/0299912 A1 | 11/2012 | Kapur et al. | |
| 2013/0145272 A1* | 6/2013 | Boggie | G06F 3/167 |
| | | | 715/728 |
| 2013/0151382 A1 | 6/2013 | Fuller | |
| 2013/0238285 A1* | 9/2013 | Volchek | A41H 5/01 |
| | | | 702/188 |
| 2014/0282137 A1 | 9/2014 | Lin et al. | |
| 2015/0073907 A1 | 3/2015 | Purves et al. | |
| 2016/0284017 A1 | 9/2016 | Almog et al. | |
| 2016/0321547 A1* | 11/2016 | Johnson | G06Q 10/087 |
| 2016/0364758 A1 | 12/2016 | Achhra et al. | |
| 2017/0076011 A1 | 3/2017 | Gannon | |
| 2017/0206691 A1* | 7/2017 | Harrises | G02B 27/0172 |
| 2017/0352091 A1 | 12/2017 | Chen et al. | |
| 2018/0130114 A1 | 5/2018 | Hawkins et al. | |
| 2018/0173807 A1* | 6/2018 | Prakash | G06Q 10/087 |

OTHER PUBLICATIONS

"Virtual Try-On Through Image-Based Rendering," by Stefan Hauswiesner, Matthias Straka, and Gerhard Reitmayr, IEEE Transactions on Visualization and Computer Graphics, vol. 19, No. 9, Sep. 2013 (Year: 2013).*

"Virtual Mirror Rendering With Stationary RGB-D Cameras and Store 3-D Background," by Ju Shen, Po-Chang Su, Sen-ching Samson Cheung, and Jian Zhao, IEEE Transactions on Image Processing, vol. 22, No. 9, Sep. 2013, pp. 3433-3448 (Year: 2013).

\* cited by examiner

SYSTEMS AND METHODS FOR WARDROBE MANAGEMENT

CROSS-REFERENCE TO RELATED APPLICATION

This application is a continuation of U.S. patent application Ser. No. 15/665,913, filed 1 Aug. 2017, which claims the benefit of U.S. Provisional Application No. 62/437,710, filed 22 Dec. 2016, the entire contents and substance of which are hereby incorporated by reference.

FIELD OF INVENTION

The present disclosure relates to systems and methods for wardrobe management, and more particularly utilizing a virtual wardrobe management system to provide real-time garment recommendations for wear, purchase, or replacement.

BACKGROUND

Many consumers are very deliberate and careful about what garments they buy, and what garments they choose to wear each day. There are many factors that a consumer may take into consideration when making a decision about what to wear on a particular day or for a particular occasion, including for example, the weather, the level of formality that is appropriate (e.g., casual, business casual, or formal), fashion trends, the frequency or how recently a garment was worn, the condition of the garment, or how well the garment complements the other clothing items and accessories the consumer is going to wear. However, over years of accumulating various clothing items, a consumer may begin to lose track of what garments they own, which may result in particular garments lying unduly idle for long periods of time or missed opportunities to create a more appealing clothing ensemble when getting dressed. Therefore, there is a need for a system to allow a consumer to keep track of what garments they own and aid in decisions regarding what garments to wear or purchase on an ongoing basis.

Services exist that may send a photographer to a consumer's home to photograph and catalog the consumer's clothing items, but this is both expensive and time-consuming. Also, such a catalog requires considerable effort to maintain and does not accurately reflect the changing conditions of the garments. Additionally, such a catalog does not provide much advantage with regards to providing guidance in decisions about what garments to wear or buy because it still requires the consumer to make a decision after viewing each item, as they would if they simply looked at the garments in their closet. Furthermore, such a catalog only provides a snapshot of the consumer's wardrobe at a particular time, and requires further expense, time, and effort, to update.

Accordingly, for these and other reasons, there is a need for systems and methods for providing a virtual wardrobe management system to assist consumers with making decisions about their wardrobe. A virtual wardrobe system may maintain a database that catalogs each garment owned by the consumer, may track the usage of each garment, and may make recommendations to the consumer about which garments to wear or buy. A virtual wardrobe system may also allow a user to make better garment decisions by providing a visualization of recommended garments or clothing ensembles. Embodiments of the present disclosure are directed to this and other considerations.

SUMMARY

Disclosed embodiments provide systems and methods for wardrobe management, and more particularly utilizing a virtual wardrobe system to provide real-time garment recommendations.

Consistent with the disclosed embodiments, the system may include one or more memory devices storing instructions, and one or more processors configured to execute the instructions to perform steps of a method to provide a virtual wardrobe managements system. The system may store wardrobe data associated with a plurality of garments. The wardrobe data may include one or more of a type, a size, a color, a pattern, or a design of each of the plurality of garments. The system may then receive input data indicative of a garment selection. The system may identify the garment based on the input data received. The system may then generate a garment recommendation based on the selected garment and the stored wardrobe data and provide an indication of the recommendation to a computing device.

Consistent with the disclosed embodiments, methods for providing real-time clothing recommendations are also provided.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
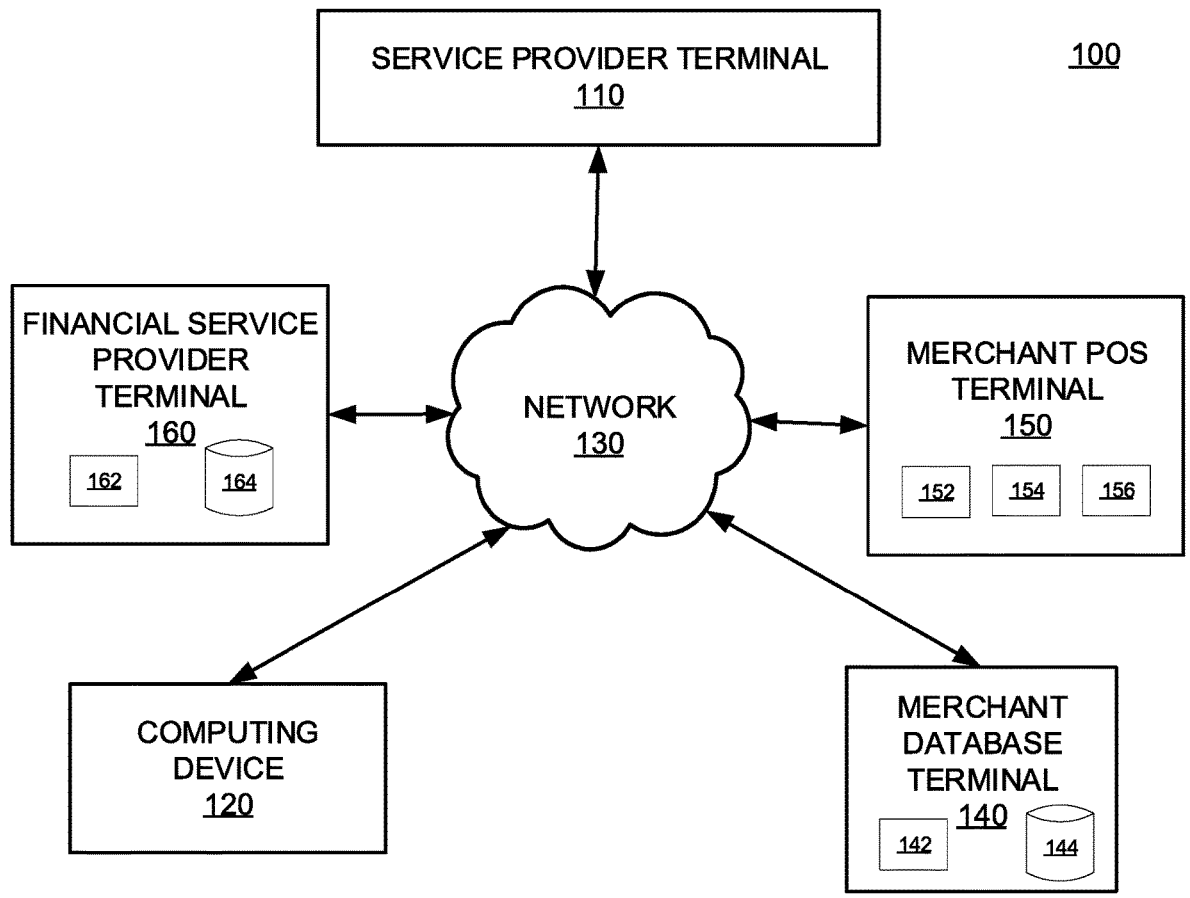
FIG. 1 is a diagram of an exemplary system that may be used to provide a real-time clothing recommendation.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for providing a virtual trial fitting. The system may include one or more memory devices storing instructions, and one or more processors configured to execute the instructions to perform steps of a method. Specifically, in some embodiments, the system may provide a virtual wardrobe management system for providing real-time garment recommendations. To accomplish this, the system may execute the instructions to store wardrobe data associated with a plurality of garments. The wardrobe data may include one or more of a type, a size, a color, a pattern, an age, a value, or a design of each of the plurality of garments. The system may then receive input data indicative of a garment selection. The system may identify the garment based on the input data received. The system may then generate a garment recommendation based on the selected garment and the stored wardrobe data and provide an indication of the recommendation to a computing device.

In another aspect, a non-transitory computer-readable medium storing instructions is disclosed. The instructions, when executed by one or more processors, may cause a computing device to perform steps of a method for providing a virtual wardrobe management system. Specifically, the computing device may store wardrobe data associated with a plurality of garments. The wardrobe data may include one or more of a type, a size, a color, a pattern, or a design of each of the plurality of garments. The computing device may then receive input data indicative of a garment selection. The computing device may then identify the garment based on the input data received. In response to this identification, the computing device may then generate a garment recommendation based on the selected garment and the stored wardrobe data and provide an indication of the recommendation to a computing device.

In another aspect, a method of providing a virtual wardrobe management system is disclosed. The disclosed method can include storing wardrobe data associated with a plurality of garments and receiving input data indicative of a garment selection. Next, the method may include identifying a selected garment of the plurality of garments based on the input data and generating a garment recommendation based on the selected garment and the stored wardrobe data. The method may then include providing an indication of the garment recommendation to a computing device.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary system that may be configured to perform one or more processes that can provide a virtual wardrobe management system that may store wardrobe data and generate garment recommendations. The components and arrangements shown in FIG. 1 are not intended to limit the disclosed embodiments as the components used to implement the disclosed processes and features may vary.

In accordance with disclosed embodiments, virtual wardrobe management system 100 may include a service provider terminal 110 in communication with a computing device 120 via network 130. In some embodiments, service provider terminal 110 is also in communication with a merchant database terminal 140 via network 130. Computing device 120 may include a mobile computing device (e.g., a smart phone, tablet computer, smart wearable device, portable laptop computer, voice command device, or other mobile computing device) or a stationary computing device (e.g., a stationary desktop or other stationary computer). Computing device 120 may belong to or be provided by a consumer, or may be borrowed, rented, or shared. In some embodiments, computing device 120 may be configured to provide one or more of an augmented reality and a virtual reality experience to one or more users, and may be equipped with a display, speakers or other auditory devices, tactile simulators, and other devices configured to engage the user's senses to enhance the augmented/virtual reality experience.

In some embodiments, virtual wardrobe management system 100 may connect to a merchant database terminal 140 that communicates with other devices of system 100 via network 130. Optionally, in some embodiments, virtual wardrobe management system 100 may also include a merchant point of sale (POS) terminal 150 that communicates with other devices of system 100 via network 130. Additionally, in some embodiments, virtual wardrobe management system 100 may also include a financial service provider terminal 160 that communicates with other devices of system 100 via network 130.

Network 130 may be of any suitable type, including individual connections via the internet such as cellular or WiFi networks. In some embodiments, network 130 may connect terminals using direct connections such as radio-frequency identification (RFID), near-field communication (NFC), Bluetooth™, low-energy Bluetooth™ (BLE), WiFi™, ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
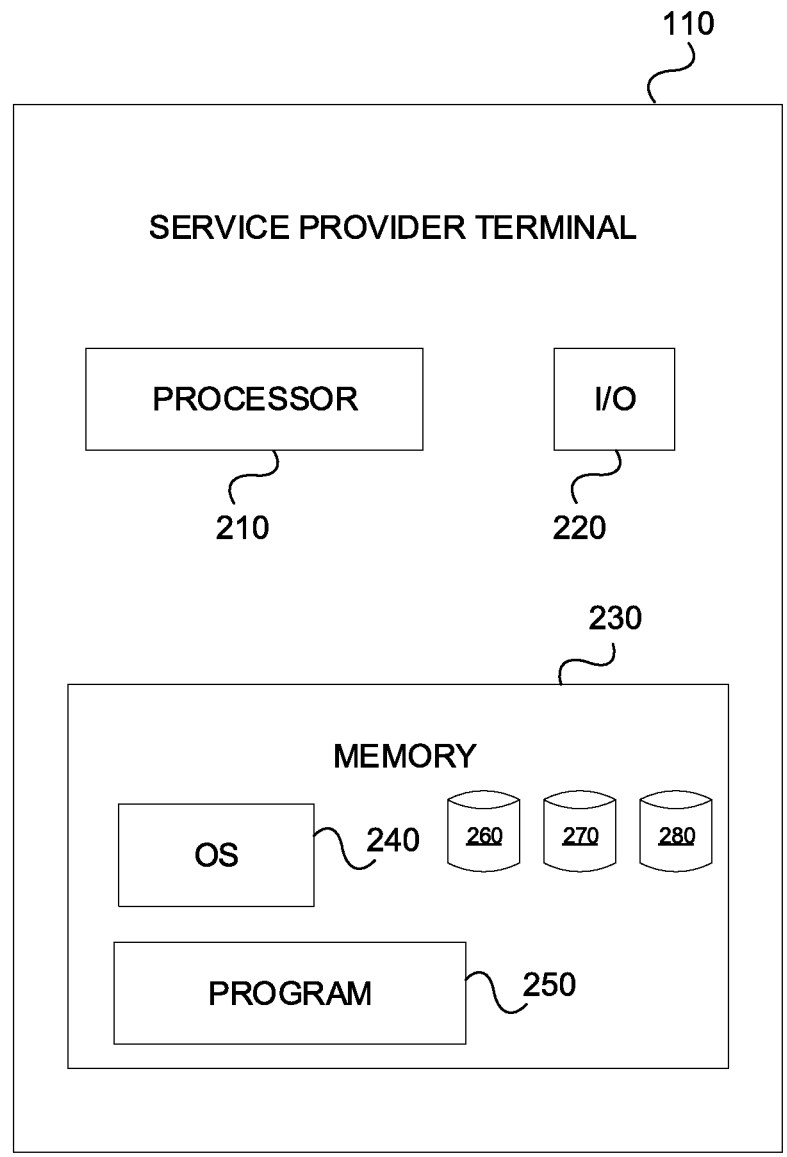
FIG. 2 is a component diagram of an exemplary service provider terminal.

An exemplary embodiment of service provider terminal 110 is shown in more detail in FIG. 2. Computing device 120, merchant database terminal 140, merchant POS terminal 150, and financial service provider terminal 160 may have a similar structure and components that are similar to those described with respect to service provider terminal 110. As shown, service provider terminal 110 may include a processor 210, an input/output ("I/O") device 220, a memory 230 containing an operating system ("OS") 240 and a program 250. For example, service provider terminal 110 may be a single server or may be configured as a distributed computer system including multiple servers or computers that interoperate to perform one or more of the processes and functionalities associated with the disclosed embodiments. In some embodiments, the service provider terminal 110 may further include a peripheral interface, a transceiver, a mobile network interface in communication with the processor 210, a bus configured to facilitate communication between the various components of the service provider terminal 110, and a power source configured to power one or more components of the service provider terminal 110.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Service provider terminal 110 may include one or more storage devices configured to store information used by processor 210 (or other components) to perform certain functions related to the disclosed embodiments. In one example, service provider terminal 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, service provider terminal 110 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, service provider terminal 110 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include a wardrobe database 260, a wardrobe history database 270, and an environmental database 280 for storing related data to enable service provider terminal 110 to perform one or more of the processes and functionalities associated with the disclosed embodiments. Wardrobe database 260 may include stored data relating to information related to the type, size, condition, color(s), pattern(s), design(s), material(s), and other information associated with a plurality of garments. For example, wardrobe database 260 may store information, images, and/or virtual models of a plurality of garments owned by a user of the system 100. In some embodiments, garments may include shirts, pants, shorts, dresses, blouses, stockings, socks, suits, underwear, shoes, ties, hats, jackets/coats, scarves, sweaters, gloves, glasses, jewelry, watches, or any other type of clothing item or wearable accessory. In some embodiments, wardrobe database 260 may include stored data relating to garments that a user does not own but may have an interest in purchasing (i.e., a garment wish list). Wardrobe history database 270 may include stored data relating one or more garments of the plurality of garments that relate to the historical usage of each garment. For example, in some embodiments, wardrobe history database 270 may include information related to a garment including the purchase date, the price, the dates the garment has been worn, the other clothing items that the garment has been worn in combination with, the weather conditions at the time the garment has been worn, and the occasion or type of event the garment has been worn during (e.g., going to work, going on a date, or socializing with friends). Environmental database 280 may include stored data relating to a physical environment that is captured by one or more devices (e.g., computing device 120) of system 100.

Service provider terminal 110 may also be communicatively connected to one or more memory devices (e.g., databases (not shown)) locally or through a network. The remote memory devices may be configured to store information and may be accessed and/or managed by service provider terminal 110. By way of example, the remote memory devices may be document management systems, Microsoft SQL database, SharePoint databases, Oracle™ databases, Sybase™ databases, or other relational databases. Systems and methods consistent with disclosed embodiments, however, are not limited to separate databases or even to the use of a database.

Service provider terminal 110 may also include one or more I/O devices 220 that may comprise one or more interfaces for receiving signals or input from devices and providing signals or output to one or more devices that allow data to be received and/or transmitted by service provider terminal 110. For example, service provider terminal 110 may include interface components, which may provide interfaces to one or more input devices, such as one or more keyboards, mouse devices, touch screens, track pads, trackballs, scroll wheels, digital cameras, microphones, sensors, and the like, that enable service provider terminal 110 to receive data from one or more users (such as via computing device 120).

In exemplary embodiments of the disclosed technology, service provider terminal 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While service provider terminal 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the terminal 110 may include a greater or lesser number of components than those illustrated.

Merchant database terminal 140 may have one or more processors 142 and one or more merchant databases 144, which may be any suitable repository of merchant data. Merchant database terminal 140 may be located at the POS location, off-site at another merchant location, or at a third party location. Information stored in merchant database terminal 140 may be accessed (e.g., retrieved, updated, and added to) via network 130 by one or more devices (e.g., service provider terminal 110) of system 100. In other embodiments, merchant POS terminal 150 may be configured to process online transactions on behalf of the associated merchant.

Figure 8:
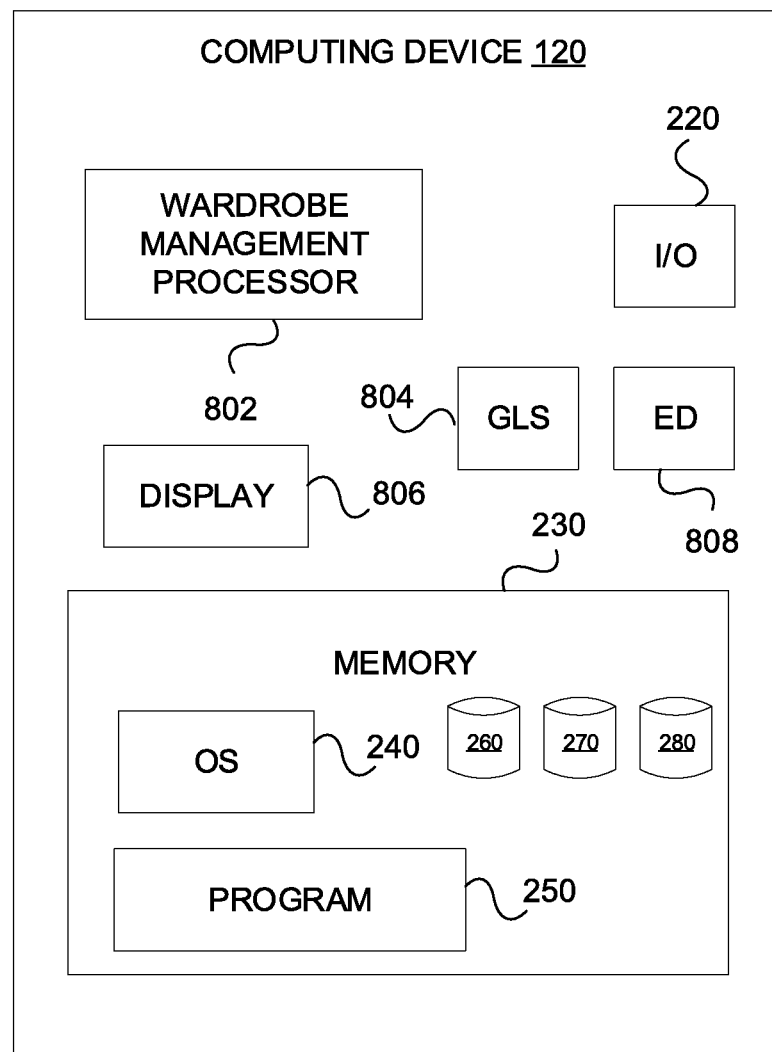
FIG. 8 is a component diagram of an exemplary computing device.

FIG. 8 shows an exemplary embodiment of computing device 120. As shown, computing device 120 may include input/output ("I/O") device 220, memory 230 for storing wardrobe data associated with a plurality of garments and containing operating system ("OS") 240 and program 250 and all associated components as described above with respect to service provider terminal 110. Computing device 120 may also have one or more processors, including a wardrobe management processor 802 for executing functions relating to virtual wardrobe management, a geographic location sensor ("GLS") 804 for determining the geographic location of computing device 120 and/or an associated environmental data sensor 808, display 806 for displaying a visual recommendation of a garment recommendation, and an environmental data ("ED") sensor 808 (which may also be referred to as an "environmental sensor") for obtaining garment selection data including visual information representing a selected garment. In some embodiments, an environmental data sensor 808 may be configured to obtain environmental data including audio and/or visual information representing a physical environment. In some embodiments, environmental data sensor 808 may include a microphone or a digital camera. In some embodiments, environmental data sensor 808 may include a physical sensor or an optimal sensor that may scan a garment being worn or held by a user.

Figure 3:
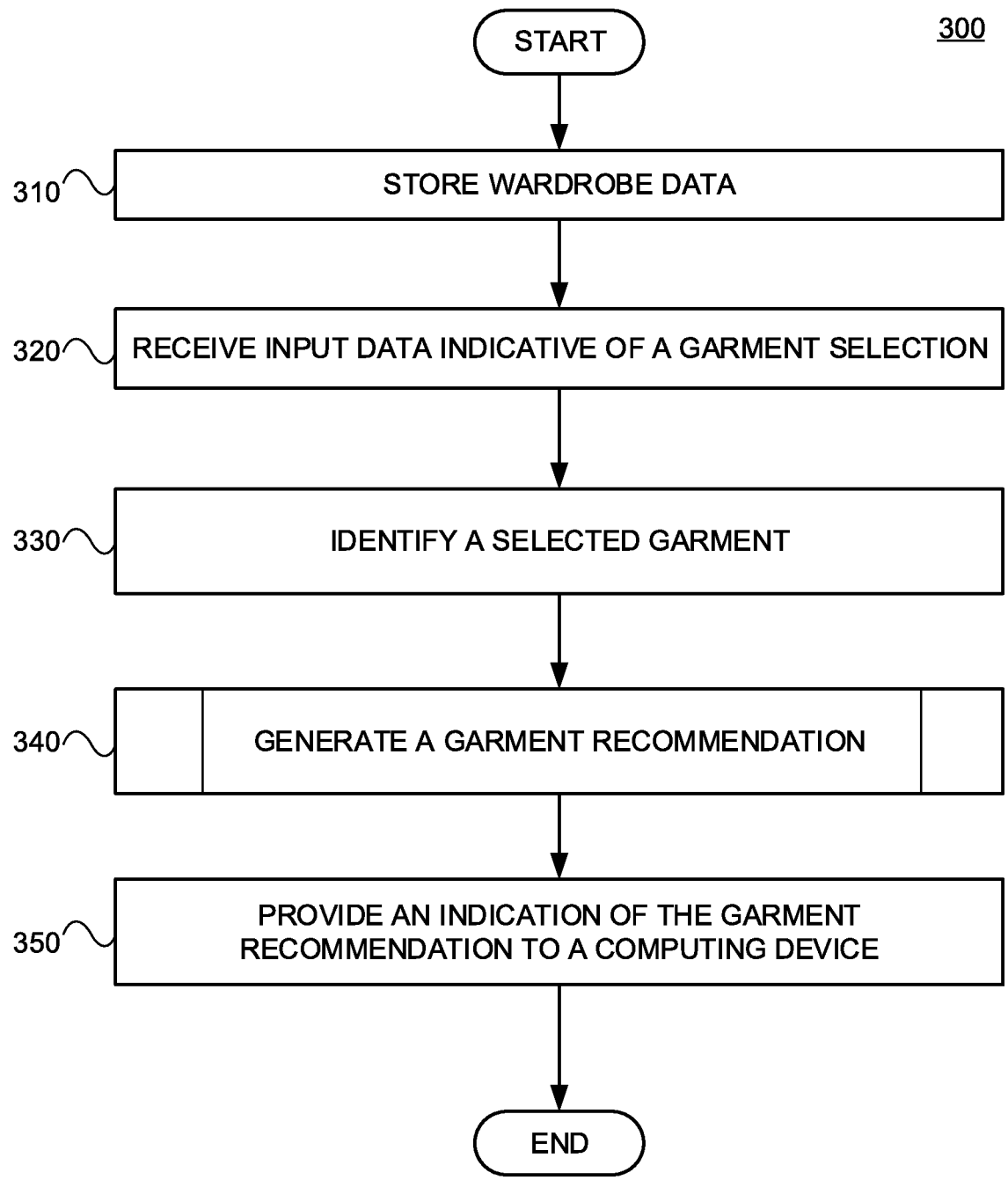
FIG. 3 is a flowchart of an exemplary method for providing a virtual wardrobe management system.

According to some embodiments, wardrobe management processor 802 may include all of the features and functions of processor 210 described above. Further, wardrobe management processor 802 may be configured to, based on garment selection data obtained from the one or more environmental sensors and the stored wardrobe data, identify the selected garment and generate a garment recommendation based on the identification of the selected garment. In some embodiments, identifying the selected garment may include performing image recognition techniques on one or more images of the selected garment. In some embodiments, generating a garment recommendation may include accessing wardrobe history data stored in the memory, determining, for the selected garment and based on the stored wardrobe history data, that (1) the time since last worn is less than a predetermined threshold number of days ago (e.g., computing device 120 may receive an input that a garment worn within the past three days should not be worn again, and may determine that the selected sweater, worn two days ago, falls into this category and should not be recommended for wearing today), or that (2) the wear frequency exceeds a predetermined threshold frequency (e.g., computing device 120 may receive input that a garment should not be worn more than five times a month, and may determine that the selected sweater, already worn five times this month, falls into this category and should not be recommended for wearing today), and generating the garment recommendation, associated with an alternative garment of the plurality of garments based on the determination. For example, generating the garment recommendation may exclude certain garments based on one or more of the above determinations (that the selected sweater was worn too recently or too often this month), and make a recommendation of an alternative garment out of the remaining garments. The wardrobe history data may include usage history information for one or more of the plurality of garments and may include one or more of a time since last worn and a wear frequency over a predetermined period. In some embodiments, a garment recommendation may include an alert that an item may be damaged or ready for replacement. The recommendation generated by wardrobe management processor 802 may be displayed by display 806 for viewing by a user. FIG. 3 shows a flowchart of method 300 for providing a virtual wardrobe management system. Method 300 may be performed by service provider terminal 110 using processor 210 to execute memory 230. In some embodiments, one or more steps of method 300 may be delegated to other devices or systems in system 100, such as computing device 120, merchant database terminal 140, merchant POS terminal 150 and/or financial service provider terminal 160. Following method 300, user(s) may receive garment recommendations to assist in decision-making regarding clothes to wear and/or purchase.

In block 310, service provider terminal 110 may store wardrobe data (e.g., in wardrobe database 260). Wardrobe data may include information such as the type, size, condition, color(s), pattern(s), design(s), or material(s), and other characteristics associated with a plurality of garments. In some embodiments, wardrobe data may include information, images, and/or virtual models of a plurality of garments owned by a user of the system 100. Wardrobe data may be entered directly by a user (e.g., via computing device 120 or merchant POS terminal 150), stored on and retrieved from merchant database terminal 140, or provided by sensors such as a 3D scanner or a 2D camera. For example, if a user purchases a new garment from a store or website, the merchant POS terminal 150 or the merchant database terminal 140 may transmit garment data associated with the newly purchased item to the service provider terminal 110 to be added to the wardrobe database 260. In some embodiments, wardrobe data may be obtained by deriving the wardrobe data from images of the garments captured by, for example, a digital camera associated with computing device 120. In some embodiments, wardrobe data to be included in a user's "wish list" may be obtained from, for example, a merchant database terminal 140 that may include data for clothing items listed for sale in a store or on a store website. For example, wardrobe data may be obtained by computing device 120 scanning garment identification information of a clothing item (e.g., a UPC code) when the user is trying an item on in the store. In some embodiments, a merchant (e.g., merchant database terminal 140) may provide wardrobe data to service provider terminal 110 to add to a user's wish list based on the items already owned by the user (e.g., a merchant might suggest a shirt to go with a particular pair of pants the user owns).

At step 320, service provider terminal 110 may receive (e.g., from computing device 120) input data indicative of a garment selection. According to some embodiments, the computing device 120 that sends the input data to the service provider terminal 110 may be associated with the plurality of garments or a user that owns the plurality of garments (e.g., computing device 120 may have one or more user profiles stored thereon that are associated with the user). Input data may be actively provided by a user (e.g., via manual input into computing device 120 or merchant POS terminal 150), or via passive methods such as visually recognizing shapes, bar codes, QR codes, or IR beacons or Bluetooth™ beacons located in an environment. In some embodiments, input data indicative of a garment selection may include images of a garment. For example, in some embodiments, a user may try on a garment in view of a camera associated with computing device 120 (e.g., the user may try on a shirt in front of a mirror while wearing an augmented reality device) and the computing device 120 may obtain images of the garment. In some embodiments, input data indicative of a garment selection may include, for example, an indication that a camera of the computing device 120 has focused on a particular item for more than a threshold period of time or a detection by computing device 120 of a physical user gesture or verbal command that indicates a selection of a particular garment.

At step 330, service provider terminal 110 may identify a selected garment of the plurality of garments based on the input data. For example, in some embodiments, service provider terminal 110 may apply image recognition techniques to images of a garment obtained from computing device 120 to identify the garment. In some embodiments, the garment may be identified using, for example, a barcode garment, a SKU, an RFID tag, or some other identifying aspect associated with the garment that may be scanned or detected by a computing device 120. In some embodiments, the garment may be identified computing device 120 receiving a user input, such as typing in identifying information on a keypad of computing device 120 or providing a verbal input. In some embodiments, service provider terminal 110 may access a merchant terminal database 140 to aid in identifying the garment by accessing merchant records associated with garments sold by the merchant. In some embodiments, in response to identifying the selected garment, the service provider terminal 110 may store usage information about the selected garment in a usage history database. The usage information may include, for example, one or more of an identification of the selected garment, a wear date, a wear time, a wear weekday, and one or more additional garments that were worn in association with the selected garment.

Figure 4:
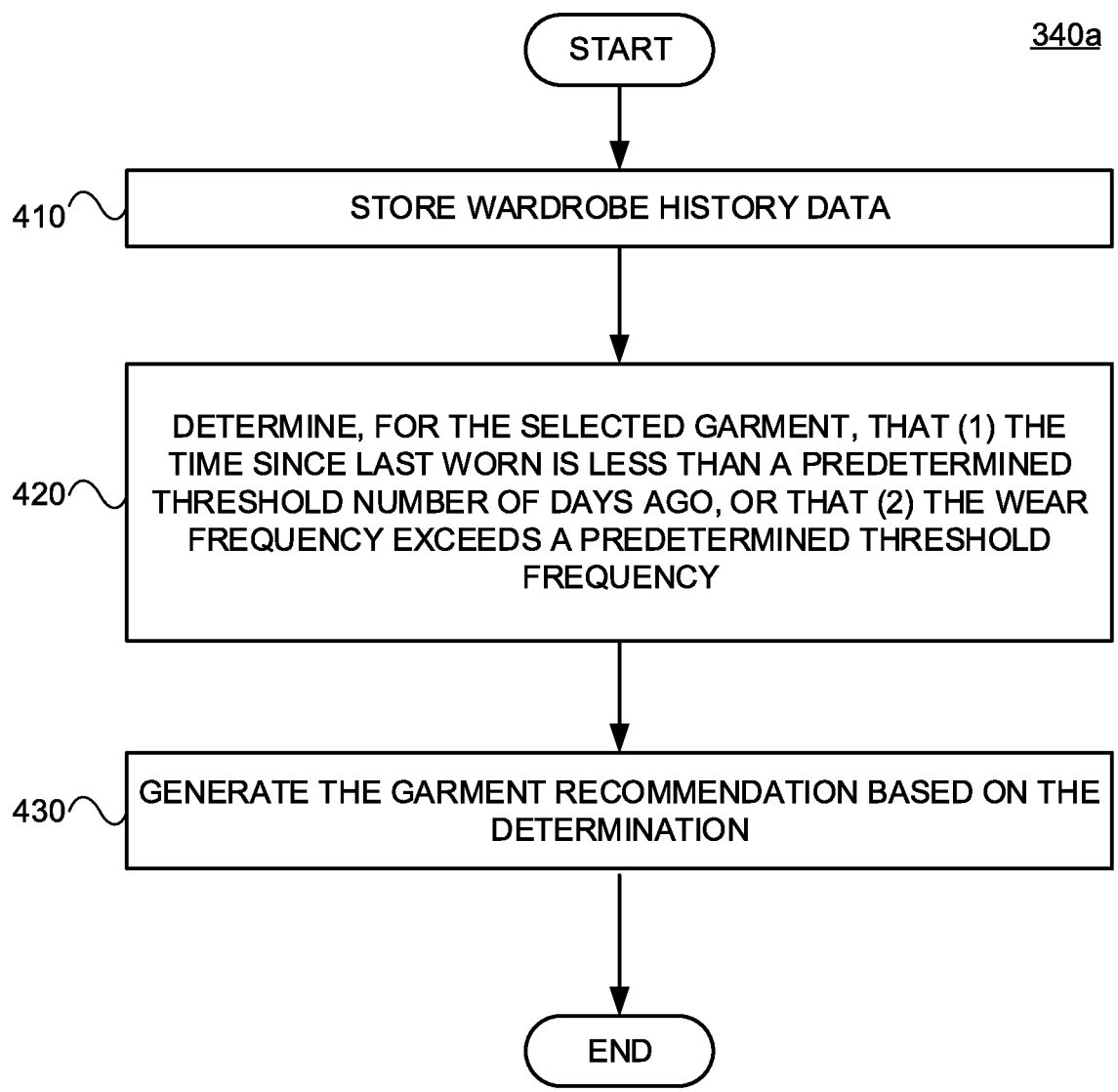
FIG. 4 is a flowchart of an exemplary method for generating a garment recommendation in accordance with a virtual wardrobe management system.

At step 340, service provider terminal 110 may generate a garment recommendation based on the selected garment and the stored wardrobe data. For example, the service provider terminal 110 may recommend that a user wear a different item of clothing than the selected garment. For example, recommendations generated by the service provider terminal 110 may include recommending complimentary items based on appearance (e.g., a shirt having a particular pattern may go well with a particular pair of pants), popularity (e.g., data obtained from a merchant database terminal 140 may indicate that a particular shirt is popularly worn with a particular pair of jeans), usage rates (e.g., a user may not want to wear the same garment too often), social data (e.g., what the friends of a user are wearing or recently wore), or environmental conditions (e.g., the season, the weather, or some event that the user is attending). In some embodiments, as described in more detail below with respect to FIGS. 4-6, block 340 may include one or more additional steps that result in various types of recommendations. At step 350, the service provider terminal 110 may provide an indication of the garment recommendation to a computing device, such as computing device 120. For example, the service provider terminal 110 may output a message to computing device 120 providing the recommendation. In some embodiments, if the service provider terminal 110 is recommending that a user wear an alternative garment than the selected garment, the service provider terminal 110 may output a representation of an alternative garment of the plurality of garments to a computing device 120 for display by the computing device 120 in an augmented environment. For example, if a user is wearing an augmented reality device 120 and viewing themselves in a mirror, the augmented reality device 120 may superimpose a visual representation of the alternative garment over the user's image in the mirror to provide the user with a visual representation of what the alternative garment would look like if worn with the other garments the user is currently wearing. According to some embodiments, a visual representation of a garment may be generated from a 2D or 3D model of the garment that may be created by the service provider terminal 110 based on the stored wardrobe data. In some embodiments, the service provider terminal 110 may output a representation of the selected garment in association with representations of one or more additional garments of the plurality of garments to the computing device 120, for display on the computing device 120 in a virtual environment. For example, computing device 120 may output a visual representation of the user, such as a virtual avatar that looks like the user, wearing the alternative garment while walking up and down on a catwalk.

In some embodiments, a recommendation may include a recommendation to purchase an item that the user does not currently own. For example, the user may own a pair of pants but may not own a suitable shirt to go with the pants. Accordingly, the system may access merchant clothing data (e.g., sizes, colors, designs, etc.) from a merchant database terminal 140 and make a recommendation to purchase a clothing item based on the merchant clothing data. In some embodiments, a recommendation may utilize sales data from the merchant to take into account the popularity or cost of a particular clothing item. In some embodiments, a recommendation may utilize suggested pairings of clothing items provided by a merchant or a third party source, such as a stylist, consultant, peer group, or any other suitable source. According to some embodiments, a user may opt to add a recommended clothing item to a wish list instead of immediately purchasing the item. The system 100 may enable the purchase of an item from the wish list by, for example, remotely enabling a transaction with a merchant POS terminal 150 (e.g., a user may access an item on the wish list using computing device 120 and select a purchase option associated with the item which may initiate a purchase transaction with a merchant POS terminal 150).

As mentioned above, according to various embodiments of the present disclosure, step 340 may include one or more additional steps for generating a garment recommendation. For example, in FIG. 4, method 340a may include, at block 410, the service provider terminal 110 storing wardrobe history data comprising usage history information for one or more of the garments of the plurality of garments. In some embodiments, the usage history information may include the time since a garment was last worn. In some embodiments, the usage history information may include a wear frequency associated with the garment, where the wear frequency pertains to a predetermined period of time. At block 420, the service provider terminal 110 may determine, for the selected garment and based on the stored wardrobe history data, that (1) the time since the garment was last worn is less than a predetermined threshold number of days ago, or that (2) the wear frequency exceeds a predetermined threshold frequency. For example, a user may not want to wait at least ten days before wearing the same garment twice, or similarly, the user may not want to wear a particular garment more than three times a month. Accordingly, the service provider terminal 110 may track the usage history information of a garment and determine if the user is about to wear the more frequently than is desired. At step 430, the service provider terminal 110 may generate the garment recommendation based on the determination, wherein the garment recommendation is associated with an alternative garment of the plurality of garments. For example, if the service provider terminal 110 determines that the selected garment is about to be worn too soon (i.e., too frequently or to close in proximity to the previous time it was worn), the service provider terminal may recommend that the user wear an alternative garment.

Figure 5:
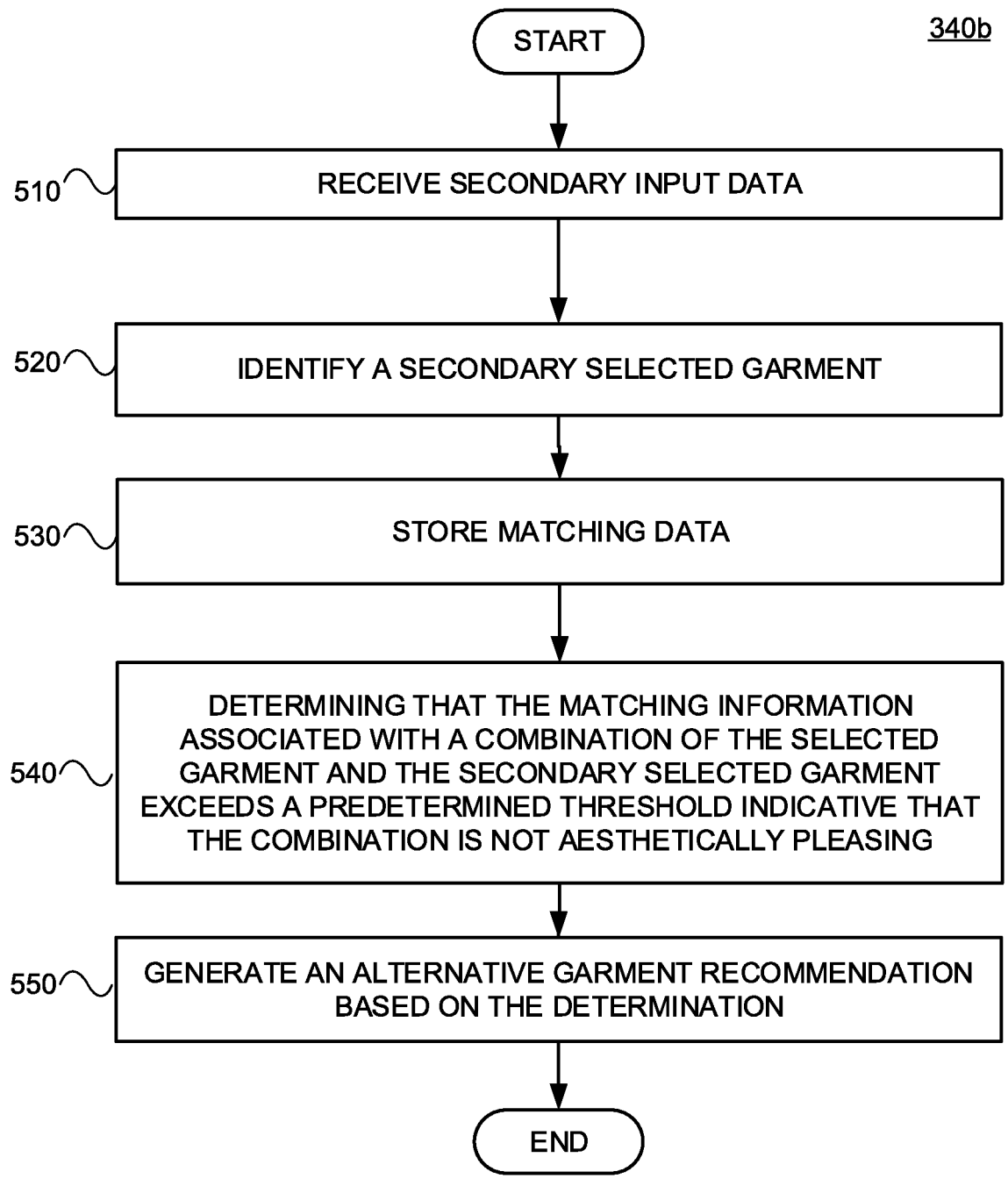
FIG. 5 is a flowchart of an exemplary method for generating a garment recommendation in accordance with a virtual wardrobe management system.

FIG. 5 shows a flowchart of method 340b for generating a garment recommendation. At step 510, the service provider terminal 110 may receive secondary input data, where the secondary input data is indicative of a secondary garment selection. For example, a user may select a shirt that they are considering wearing as a first garment and a pair of pants that they are considering wearing as a secondary garment. At block 520, the service provider terminal 110 may identify a secondary selected garment of the plurality of garments based on the secondary input. The identification of the secondary selected garment may be performed by the service provider terminal 110 in a similar manner as the identification of the first selected garment described previously above. At block 530, the service provider terminal 110 may store matching data comprising matching information associated with one or more combinations of the plurality of garments. According to some embodiments, the matching information may represent pairings of garments that may be fashionable or aesthetically pleasing when paired together. In some embodiments, the service provider terminal 110 may receive matching data from through user inputs (e.g., via computing device 120). In some embodiments, matching data may be provided to the service provider terminal 110 by a merchant (e.g., via merchant database terminal 140). In some embodiments, the matching data may be generated by the service provider terminal 110 by performing an analysis of the colors, shapes, sizes, patterns, and/or designs of the plurality of garments. For example, the service provider terminal 110 may determine a matching score for every pair of garments that reflects an estimation of how well the garments go together. In some embodiments, the service provider terminal 110 may generate matching data based on historical usage data of the garments. For example, if a user has frequently worn two garments together, the service provider terminal 110 may determine that those two garments have a higher matching score. At block 540, the service provider terminal 110 may determine that the matching information associated with a combination of the selected garment and the secondary selected garment exceeds a predetermined threshold indicative that the combination is not aesthetically pleasing. At block 550, the service provider terminal 110 may generate an alternative garment recommendation based on the determination, wherein the alternative garment recommendation is associated with an alternative garment of the plurality of garments that differs from the secondary garment. For example, if the service provider terminal 110 determines that the selected garment and the secondary garment do not adequately match, the service provider terminal 110 may recommend one or more alternative garments that better match with the selected garment.

Figure 6:
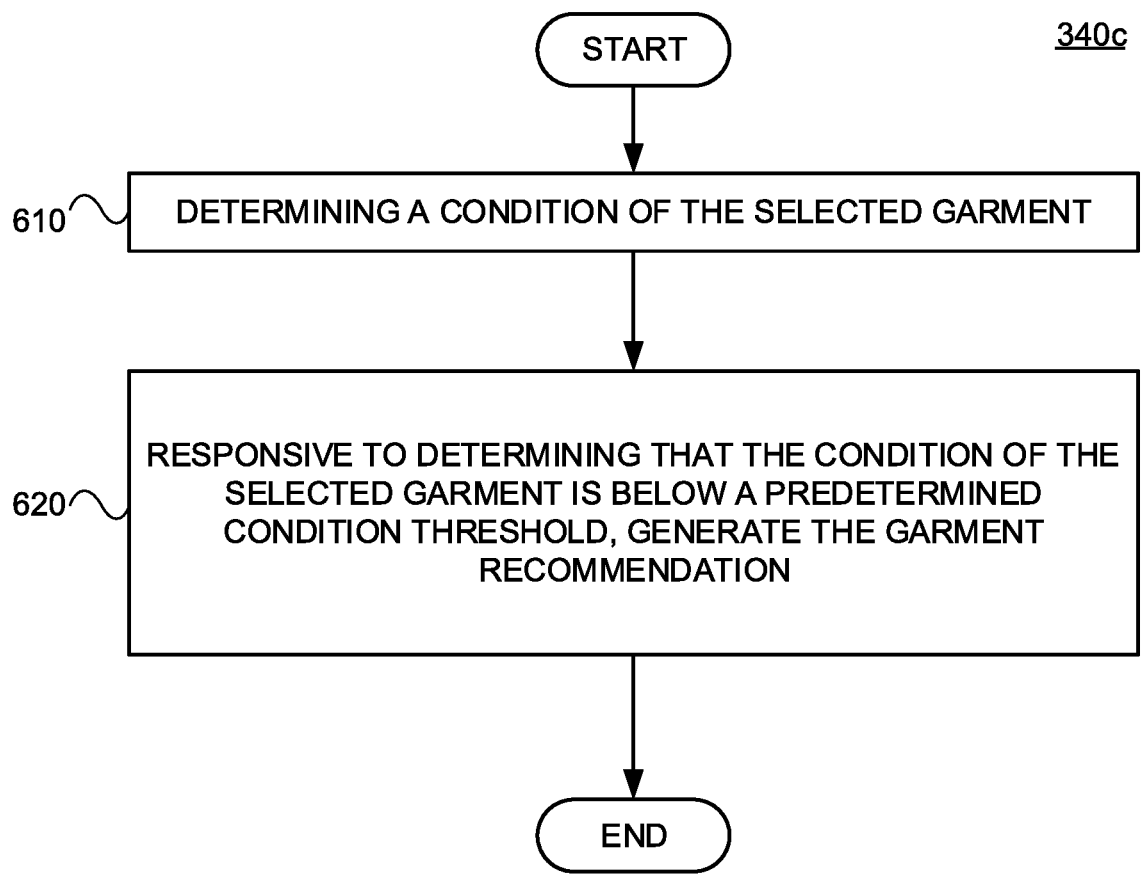
FIG. 6 is a flowchart of an exemplary method for generating a garment recommendation in accordance with a virtual wardrobe management system.

FIG. 6 shows a flowchart of method 340c for generating a garment recommendation. At step 610, the service provider terminal 110 may determine a condition of the selected garment by analyzing the image data. For example, the service provider terminal 110 may analyze the condition of the garment by detecting holes, fraying, discoloration, fading, or any other visual indications of a reduction in condition of the garment. At step 620, the service provider terminal 110 may generate the garment recommendation in response to determining that the condition of the selected garment is below a predetermined condition threshold.

According to some embodiments, the garment recommendation may indicate that the selected garment be replaced.

Figure 7:
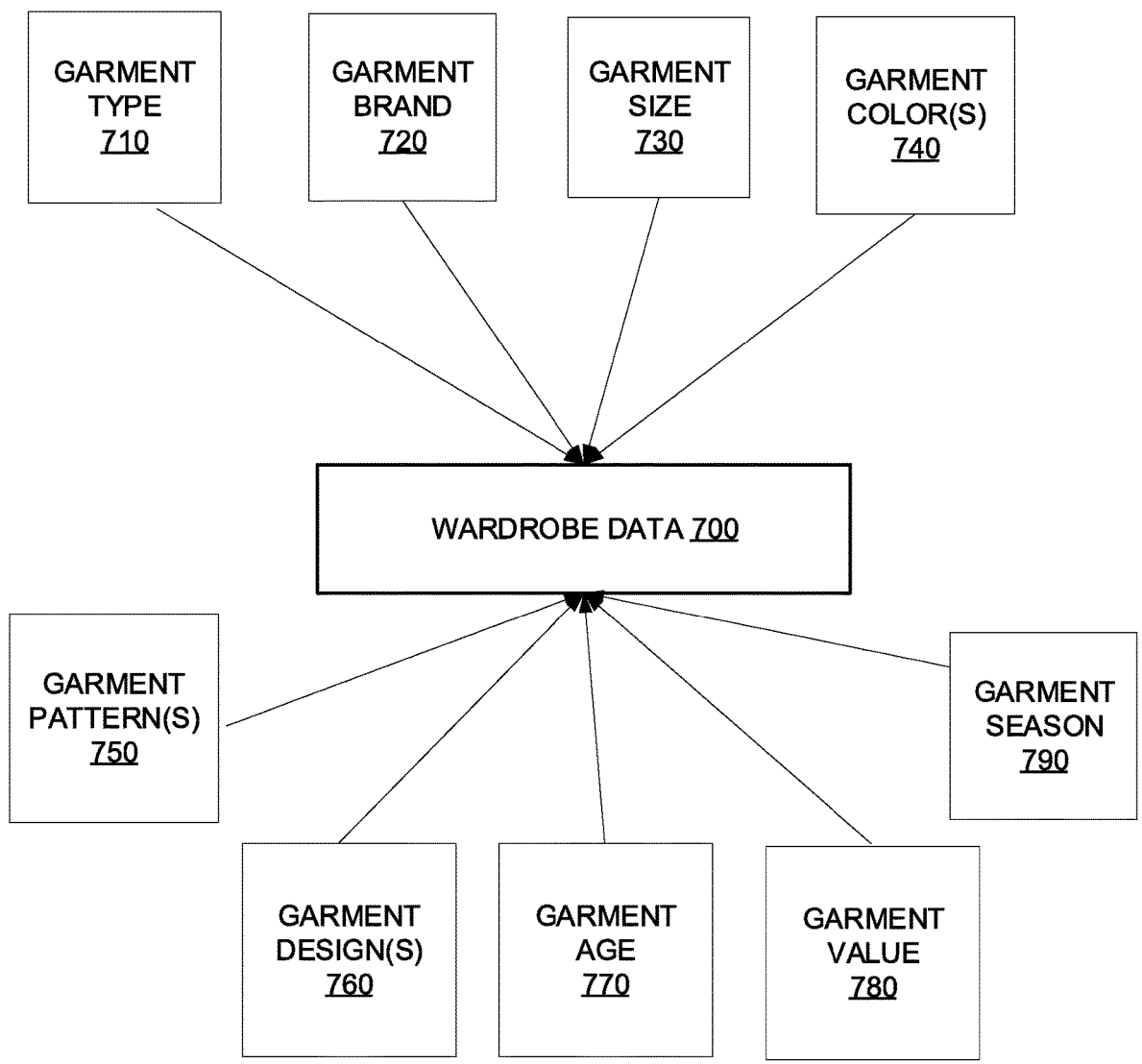
FIG. 7 is a diagram that represents an embodiment of exemplary types of wardrobe data.

FIG. 7 shows a diagram that represents an embodiment of exemplary types of wardrobe data 700. For example, wardrobe data 700 may include garment type 710, garment brand 720, garment size 730, garment color(s) 740, garment pattern(s) 750, garment design(s) 760, garment age 770, garment value 780, and garment season 790. In some embodiments, garment type 710 may indicate the type of clothing item that the garment is. For example, garment type may be a shirt, pants, shorts, dress, blouse, socks, shoes, glasses, watch, bracelet, or any other type of wearable clothing item or accessory. Garment size 730 may be a size classification such as small, medium, large, extra large and the like, or may be dimensions of a clothing item (e.g., a length and a waist size for pants). Garment color(s) 740 may include a list of colors included in the garment, and may indicate dominant colors and secondary colors. Garment pattern(s) 750 may include information about patterns in the garment, such as for example, a solid color, a checkered pattern, a striped pattern, a dotted pattern, or any other such type of pattern. Garment design(s) 760 may include information about various design features of a garment, such as for example, whether the garment features words, images, or logos. Garment age 770 may include information about when the garment was manufactured or purchased. Garment value may include information about how much the garment cost when purchased, what the garment's sales price is currently, or what another may be willing to pay for the garment. Garment season 790 may include information about months, dates, seasons, occasions (such as holidays), environments, or weather that the garment may be appropriate or recommended to be worn in.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations,"

"some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use case describes one example of a typical user flow pattern. It is intended solely for explanatory purposes and not in limitation. The user may have stored a representation of their entire wardrobe in the system (e.g., system 100) by manually entering information about each item (e.g., via computing device 120), taking photos with each item with a personal computing device (e.g., computing device 120), scanning barcodes when purchasing the items (e.g., via merchant terminal 150), or some combination of these or other methods. The system (e.g., via service provider terminal 110) may identify each garment and may obtain characteristic data about each garment (e.g., via merchant database terminal 140), such as the brand, size, material, color, pattern, and design of each garment. After cataloging the garments owned by the user, the system may provide a virtual closet (e.g., via computing device 120) that may allow a user to view virtual representations of garments or combinations of garments. Additionally, the system may enable a user to view representations of garments in an augmented reality. For example, if a user is looking at themselves in the mirror while wearing an augmented reality device (e.g., computing device 120), the system may enable a user to simulate wearing different garments by superimposing a visual representation of a garment over the user's reflection in the mirror.

Embodiments of this disclosure may be used to assist a user in making clothing decisions, such as what garment to wear, purchase, sell, donate, or otherwise get rid of. In addition to keeping track of what garments the user owns, the system (e.g., via service provider terminal 110) may also track the usage of the garments. For example, a user might be wearing an augmented reality device (e.g., computing device 120) each morning and the augmented reality device may determine that a user is considering wearing a particular garment, by for example, detecting that the user is trying the garment on while looking at a mirror. The system (e.g., via service provider terminal 110) may track which garments are worn each day and maintain a database of historical garment usage. The system (e.g., via service provider terminal 110) may then generate garment recommendations based on the historical garment usage. For example, the system (e.g., via service provider terminal 110) may recommend that a user wear a different garment based on the fact that the selected garment was worn too recently, too frequently, or does not match well with the other clothing that the user is wearing. The system may also recommend wearing a different garment based on the style of the garment, the season of the year, the color of the garment, the pattern of the garment, an event in a user's calendar (e.g., if the user's calendar indicates the user is going to a nice dinner in one instance and the user is going to a sporting event in another instance), or the local weather. The system may suggest alternative garments, and may allow a user to preview the alternative garment (e.g., via computing device 120) in an augmented reality or a virtual reality to aid the user in making decisions about what to wear. The system may also monitor the condition of a garment by obtaining images of a garment over time and performing (e.g., by the service provider terminal 110) an analysis on the images to detect signs of wear and tear. If the system detects that a particular garment has become too worn, it may recommend replacing it.

Another exemplary case relates to shopping for new clothing at a store. The user may be at a store trying on new clothes and considering whether or not to purchase a particular item. Using a mobile device (e.g., computing device 120), the user may access their virtual closet to view other items they own. For example, if a user is considering buying a particular shirt, they may view their virtual closet to see what other shirts they own to determine if they already own a shirt that is similar. Additionally, if a user is unsure if a particular garment will go well with other clothing items the user owns, the system may enable a user to visualize clothing ensembles in an augmented environment (e.g., via computing device 120). For example, the user may try on a shirt in the changing room, and while viewing themselves in a mirror using an augmented reality device (e.g., computing device 120), the system may superimpose other clothing items onto the image of the user, such as a pair of pants, so that the user may determine if the shirt looks aesthetically pleasing with the pants. The system (e.g., via service provider terminal 110) may even provide recommendations of garments owned by the user that may match well with a garment the user is considering buying. If a user decides not to immediately purchase an item, the user may nonetheless be able to add an item to the user's "wish list" by, for example, taking a picture of the item or by scanning the item's barcode (e.g., via computing device 120), which will allow a user to keep track of the item and consider purchasing it in the future. The user can then purchase items on their wish list at any time (e.g., via merchant POS terminal 150).

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

The invention claimed is:

1. A wearable augmented reality device comprising:
   a memory for storing wardrobe data associated with a plurality of garments;
   one or more environmental sensors for obtaining garment selection data comprising visual information representing a selected garment, the one or more environmental sensors comprising a digital camera configured to obtain one or more images of the selected garment in response to detecting that a user is trying the selected garment on while looking at a reflection of the user in a mirror;
   a wardrobe management processor that, based on the garment selection data obtained from the one or more environmental sensors and the stored wardrobe data, is configured to:
      identify the selected garment based on the one or more images;
      determine a condition of the selected garment by analyzing image data to detect a visual defect of the selected garment;
      responsive to determining that the condition of the selected garment is below a predetermined condition threshold, generate a garment recommendation based on the identification of the selected garment, the garment recommendation being associated with an alternative garment of the plurality of garments; and
      generate a visual representation of the alternative garment; and
   a display configured to display a visual representation of the garment recommendation by superimposing the visual representation of the alternative garment over a live image of the user via the display.

2. The device of claim 1, wherein generating a garment recommendation comprises:
   accessing wardrobe history data stored in the memory, the wardrobe history data comprising usage history information for one or more of the plurality of garments and comprising one or more of a time since last worn and a wear frequency over a predetermined period;
   determining, for the selected garment and based on the stored wardrobe history data, that (1) the time since last worn is less than a predetermined threshold number of days ago, or that (2) the wear frequency exceeds a predetermined threshold frequency; and
   generating the garment recommendation based on the determination, wherein the garment recommendation is associated with the alternative garment of the plurality of garments.

3. The device of claim 1, wherein the visual defect comprises a hole in the selected garment, fraying of the selected garment, discoloration of the selected garment, fading of the selected garment, or some combination thereof.

4. The device of claim 1, wherein the wardrobe data comprises at least one type of garment type, garment brand, garment size, garment color, garment pattern, garment design, garment age, garment value, and garment season.

5. A virtual wardrobe management system, comprising:
   a wearable augmented reality device;
   one or more processors in communication with the wearable augmented reality device; and
   a memory in communication with the one or more processors and storing instructions that, when executed by the one or more processors, are configured to cause the system to:
   responsive to detecting by the wearable augmented reality device worn by a user that the user is trying a selected garment on while looking at a reflection of the user in a mirror, obtain one or more images of the selected garment by a camera associated with the wearable augmented reality device;
   receive, from the wearable augmented reality device, input data indicative of the selected garment, the input data comprising image data representative of the one or more images of the selected garment;

identify the selected garment from a plurality of garments based on the input data;

determine a condition of the selected garment by analyzing the image data to detect a visual defect of the selected garment;

responsive to determining that the condition of the selected garment is below a predetermined condition threshold, generate a garment recommendation based on the selected garment and stored wardrobe data, the garment recommendation being associated with an alternative garment of a plurality of garments;

generate a visual representation of the alternative garment for display by the wearable augmented reality device;

provide, to the wearable augmented reality device, the visual representation of the alternative garment for display by the wearable augmented reality device; and display, by the wearable augmented reality device, the visual representation of the alternative garment superimposed over a live image of the user.

6. The system of claim 5, wherein the visual defect comprises a hole in the selected garment, fraying of the selected garment, discoloration of the selected garment, fading of the selected garment, or some combination thereof.

7. The system of claim 5, wherein the input data indicative of the selected garment comprises an indication that the camera associated with the wearable augmented reality device has focused on the selected garment for more than a threshold period of time.

8. The system of claim 5, wherein the input data is actively provided by the user.

9. The system of claim 5, wherein the input data is passively provided by at least one method of visually recognizing shapes, visually recognizing bar codes, and visually recognizing quick response (QR) codes.

10. The system of claim 5, wherein generating the garment recommendation is based on popularity data obtained from a merchant database terminal.

11. The system of claim 5, wherein the stored wardrobe data associated with the plurality of garments comprises one or more of a type, a size, a color(s), a pattern(s), and a design(s) of each of the plurality of garments.

12. The system of claim 5, wherein providing the visual representation of the alternative garment associated with the garment recommendation comprises outputting, to the wearable augmented reality device and for display on the wearable augmented reality device in a virtual environment, a representation of the selected garment in association with representations of one or more additional garments of the plurality of garments.

13. A non-transitory computer-readable medium storing instructions that, when executed by one or more processors, cause a computer system to:

responsive to detecting by a wearable augmented reality device worn by a user that the user is trying a selected garment of a plurality of garments on while looking at a reflection of the user in a mirror, obtain one or more images of the selected garment by a camera associated with a wearable augmented reality device;

identify the selected garment from the plurality of garments based on the one or more images of the selected garment;

determine a condition of the selected garment by analyzing the one or more images of the selected garment to detect a visual defect of the selected garment;

responsive to determining that the condition of the selected garment is below a predetermined condition threshold, generate a garment recommendation based on the selected garment and stored wardrobe data, the garment recommendation being associated with an alternative garment of the plurality of garments;

generate, a visual representation of the alternative garment for display by the wearable augmented reality device;

provide, to the wearable augmented reality device, the visual representation of the alternative garment for display by the wearable augmented reality device; and display, by the wearable augmented reality device, the visual representation of the alternative garment superimposed over a live image of the user.

14. The non-transitory computer-readable medium of claim 13, wherein the visual defect comprises a hole in the selected garment, fraying of the selected garment, discoloration of the selected garment, fading of the selected garment, or some combination thereof.

15. The non-transitory computer-readable medium of claim 13, wherein the selected garment is selected via received input data that is actively provided by the user.

16. The non-transitory computer-readable medium of claim 13, wherein the selected garment is selected via received input data that is passively provided by at least one method of visually recognizing shapes, visually recognizing bar codes, and visually recognizing quick response (QR) codes.

17. The non-transitory computer-readable medium of claim 13, wherein the stored wardrobe data comprises at least one type of garment type, garment brand, garment size, garment color, garment pattern, garment design, garment age, garment value, and garment season.

18. A method of providing a virtual wardrobe management system, comprising:

responsive to detecting by a wearable augmented reality device worn by a user that the user is trying a selected garment of a plurality of garments on while looking at a reflection of the user in a mirror, obtaining one or more images of the selected garment by a camera associated with the wearable augmented reality device;

identify the selected garment from the plurality of garments based on the one or more images of the selected garment;

determining, by a service provider terminal, a condition of the selected garment by analyzing the one or more images of the selected garment to detect a defect of the selected garment;

responsive to determining that the condition of the selected garment is below a predetermined condition threshold, generating, by the service provider terminal, a garment recommendation based on the selected garment and stored wardrobe data, the garment recommendation being associated with an alternative garment of the plurality of garments;

generating, by the service provider terminal, a visual representation of the alternative garment for display by the wearable augmented reality device;

providing, by the service provider terminal and to the wearable augmented reality device, the visual representation of the alternative garment for display by the wearable augmented reality device; and displaying, by the wearable augmented reality device, the visual representation of the alternative garment superimposed over a live image of the user.

19. The method of claim 18, wherein the defect comprises a hole in the selected garment, fraying of the selected garment, discoloration of the selected garment, fading of the selected garment, or some combination thereof.

20. The method of claim 18, wherein the stored wardrobe data comprises at least one type of garment type, garment brand, garment size, garment color, garment pattern, garment design, garment age, garment value, and garment season.

\* \* \* \* \*